(12) United States Patent
Theisen

(10) Patent No.: US 8,698,611 B2
(45) Date of Patent: Apr. 15, 2014

(54) DEVICE FOR DETERMINING THE INSTANT A VEHICLE MAKES CONTACT WITH AN IMPACT OBJECT

(75) Inventor: Marc Theisen, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 602 days.

(21) Appl. No.: 10/575,658

(22) PCT Filed: Jul. 22, 2004

(86) PCT No.: PCT/DE2004/001612
§ 371 (c)(1),
(2), (4) Date: Mar. 11, 2008

(87) PCT Pub. No.: WO2005/044636
PCT Pub. Date: May 19, 2005

(65) Prior Publication Data
US 2008/0204209 A1    Aug. 28, 2008

(30) Foreign Application Priority Data

Oct. 17, 2003   (DE) .................................. 103 48 388

(51) Int. Cl.
*B60Q 1/00*        (2006.01)

(52) U.S. Cl.
USPC .......... 340/436; 340/435; 340/425.5; 701/45; 701/300; 701/301; 180/274

(58) Field of Classification Search
USPC ............... 340/436, 425.5, 435; 307/10.1, 9.1; 701/45, 300–302
See application file for complete search history.

(56) References Cited

U.S. PATENT DOCUMENTS

| | | | | |
|---|---|---|---|---|
| 3,945,459 A | * | 3/1976 | Oishi et al. ..................... | 180/274 |
| 5,515,287 A | * | 5/1996 | Hakoyama et al. ........... | 701/301 |
| 5,540,461 A | | 7/1996 | Nitschke et al. | |
| 5,559,697 A | * | 9/1996 | Wang .............................. | 701/45 |
| 5,702,124 A | * | 12/1997 | Foo et al. ...................... | 280/735 |
| 6,548,914 B1 | * | 4/2003 | Caruso et al. ................ | 307/10.1 |
| 6,636,794 B2 | * | 10/2003 | Yamashita ...................... | 701/46 |
| 6,756,887 B2 | * | 6/2004 | Evans ........................... | 340/436 |
| 7,425,043 B2 | * | 9/2008 | Doerr et al. ................... | 303/193 |
| 2003/0105569 A1 | * | 6/2003 | Roelleke ........................ | 701/45 |

FOREIGN PATENT DOCUMENTS

| | | | |
|---|---|---|---|
| DE | 196 11 718 | | 10/1997 |
| DE | 100 65 518 | | 7/2002 |
| DE | 101 55 751 | | 5/2003 |
| DE | 101 56 083 | | 5/2003 |
| DE | 101 55 659 | | 6/2003 |
| DE | 103 11 524 | | 9/2004 |
| JP | 7508945 | | 10/1995 |
| JP | 10 86788 | | 4/1998 |
| JP | 2000 219008 | | 8/2000 |
| JP | 2001247001 | * | 9/2001 |
| JP | 2001247001 A | * | 9/2001 |
| JP | 2001 277993 | | 10/2001 |
| WO | 03 042007 | | 5/2003 |

* cited by examiner

*Primary Examiner* — Steven Lim
*Assistant Examiner* — Hongmin Fan
(74) *Attorney, Agent, or Firm* — Kenyon & Kenyon LLP

(57) ABSTRACT

A device for determining the instant a vehicle makes contact with an impact object. The device determines the instant of contact by approximating a signal derived from an acceleration signal using a function.

15 Claims, 3 Drawing Sheets

DEVICE FOR DETERMINING THE INSTANT A VEHICLE MAKES CONTACT WITH AN IMPACT OBJECT

FIELD OF THE INVENTION

The present invention is directed to a device for determining the instant a vehicle makes contact with an impact object.

BACKGROUND INFORMATION

From the German Published Patent Application No. 100 65 518, it is already known to determine the instant a vehicle makes contact with an impact object on the basis of a signal from a precrash sensor system.

SUMMARY OF THE INVENTION

The object of the present invention is to precisely determine the instant of contact between the vehicle in which the device is located, and an impact object, which may be another vehicle, but other objects as well, such as a lamppost, a house wall, or also pedestrians or bicycle riders. The instant of contact is important for triggering occupant safety devices, such as airbags, seat-belt tensioners or safety roll bars, and/or for triggering pedestrian safety devices. Precise knowledge of the instant of contact is useful, in particular, when determining the severity of the crash and thus when triggering the occupant safety devices in a precisely targeted manner with respect to their restraining force. This applies especially to multistage airbags and seat-belt tensioners.

At this point, the present invention provides for the instant of contact to be determined in the most precise possible manner, exclusively on the basis of the impact velocity and the signal that was derived from an acceleration signal. The acceleration signal is advantageously generated already in the central control unit which is typically situated on the vehicle tunnel. However, external acceleration sensors or a kinematic sensor platform may likewise be used for generating this acceleration signal. Since the acceleration signal itself has too many high-frequency components for an approximation using a function to be practical, a smoothing of the signal is necessary. This smoothing operation is achieved either by an appropriate filtering, preferably a low-pass filtering and/or by a simple or double integration. When calculating the instant of contact, the impact velocity may be advantageously considered. The vehicle's own velocity and/or a signal from a surrounding-field sensor system may be used for the impact velocity. Such a signal may be the relative velocity between the vehicle and the impact object, for example.

In contrast, the device according to the present invention for determining the instant a vehicle makes contact with an impact object has the advantage that the instant of contact is able to be precisely determined, solely on the basis of an acceleration signal. This precise determination is made possible by approximating the signal that is derived from the acceleration signal. The approximation leads to a function from which the instant of contact is then able to be calculated in such a way that the zero point is determined. Since in the case of an occupant safety system, an acceleration sensor is at least provided in the central control unit, the acceleration signal is always present. Thus, no additional sensor system is needed to precisely determine the instant of contact. A quadratic function may be used, for example, as a function for approximating the signal. The quadratic function proves to be particularly well suited with respect to accuracy and degree of complexity. In this case, however, other functions are also possible which have components having higher or fractional powers or, for example, transcendental function components. Determining the instant of contact in a highly precise manner is a prerequisite for an accurately timed triggering of occupant safety devices, such as airbags, seat-belt tensioners, and safety roll bars. However, determining the precise instant of contact is also an important parameter for pedestrian protection. Thus, the device according to the present invention leads to an enhanced level of safety for the vehicle occupants. If a surrounding-field sensor system is nevertheless used to determine the instant of contact or to predict the instant of contact, then the device according to the present invention may be employed either in giving plausibility to this prediction or, as the case may be, in ascertaining a difference that may then be used separately to correct the predicted values of the surrounding-field sensor system, such as the impact velocity.

It is particularly advantageous that the device for producing the signal filters the acceleration signal or integrates the same once or twice. These measures are necessary in order to obtain a low-frequency function. In and of itself, the acceleration signal contains too many high-frequency components, for example, which greatly complicate the use of a function for an approximation, particularly with regard to determining the instant of contact. For that reason, either a heavy filtering is required or a single or double integration, which likewise have a filtering effect. When double integration is used, an approximation may be carried out using a quadratic function. From the position of the vertex of the quadratic function, the instant of contact may then be determined by backwards calculation. Thus, a linear regression problem results that is simple to solve. First or higher order low-pass filters, in particular, may be used for the filtering operation.

It is, moreover, beneficial that the device additionally takes an impact velocity into account when determining the instant of contact. This is advantageous because, the higher the impact velocity is, the faster the harder structures in the vehicle are hit, so that the process of determining the instant of contact is improved by taking the impact velocity into account. Thus, a certain velocity-dependent time interval elapses between the actual contact and the instant defined by the parabolic vertex. Thus, the process is substantially enhanced by subtracting a velocity-dependent time interval from the instant defined by the parabolic vertex. One possible approach for calculating this time interval is a velocity-dependent linear function of the form $f(cv)=a*cv+b$, a and b being parameters that are applicable to a specific vehicle. The impact velocity may be determined, in particular, as a function of the vehicle's own velocity, as a first approximation, the vehicle's own velocity being able to be used as the impact velocity; or a signal from a surrounding-field sensor system, for example from a radar, video and/or ultrasonic sensor system, may also be used, for example, in order to take into account, in particular, the relative velocity between the impact object and the vehicle.

The acceleration signal is advantageously approximated using threshold values, in that the signal is checked at these threshold values, in order to obtain sampling instants of the signal using the threshold values. In the simplest approximation, two threshold values may be used. However, good results are obtained by using four threshold values. The greater the available computing capacity and number of memory devices, the greater the number of threshold values that may also be used.

DETAILED DESCRIPTION

Figure 1:
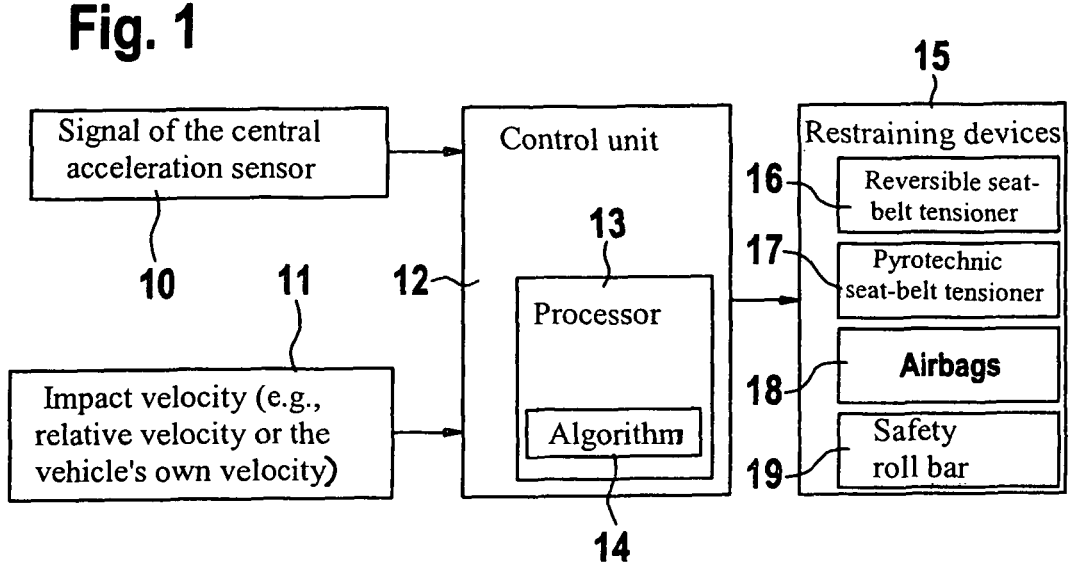
FIG. 1 shows a block diagram of the device according to the present invention.

In a block diagram, FIG. 1 clarifies the device according to the present invention. A control unit 12 has at least one acceleration sensor and receives a signal 10 from the same. This acceleration sensor is typically positioned at least in the longitudinal vehicle direction. However, the acceleration sensors may also be disposed in an angular configuration in control unit 12. In particular, a 45° placement of two acceleration sensors is known, which enables accelerations to be sensed in one plane. An acceleration sensor positioned in the transversal vehicle direction is also customary.

The control unit has a processor 13 for executing an algorithm 14 for determining the instant of contact. In addition to algorithm 14, other algorithms are also executed, for example for determining the triggering times for the restraining devices. Accordingly, control unit 12 controls restraining devices 15 via trigger circuits. These include reversible seat-belt tighteners 16, which, in particular, must be actuated electromotively, pyrotechnic seat-belt tighteners 17, airbags 18 and safety roll bars 19. One option, as described above, is allowing for the impact velocity. Thus, impact velocity 11 may be determined on the basis of the relative velocity, thus using a surrounding-field sensor signal and/or the vehicle's own velocity. The simplest approach is to use the vehicle's own velocity, which is determined using wheel-speed sensors and/or from the speedometer information, as impact velocity. The signal of central acceleration sensor 10 is optionally filtered by processor 13 and/or integrated once or twice, in order to smooth the same. The smoothed signal is then approximated by a function in processor 13 and in algorithm 14, in order to calculate the instant of contact from the vertex of the quadratic function, for example. It is optionally possible, in consideration of impact velocity 11, for the calculated instant of contact to be corrected.

Figure 2:
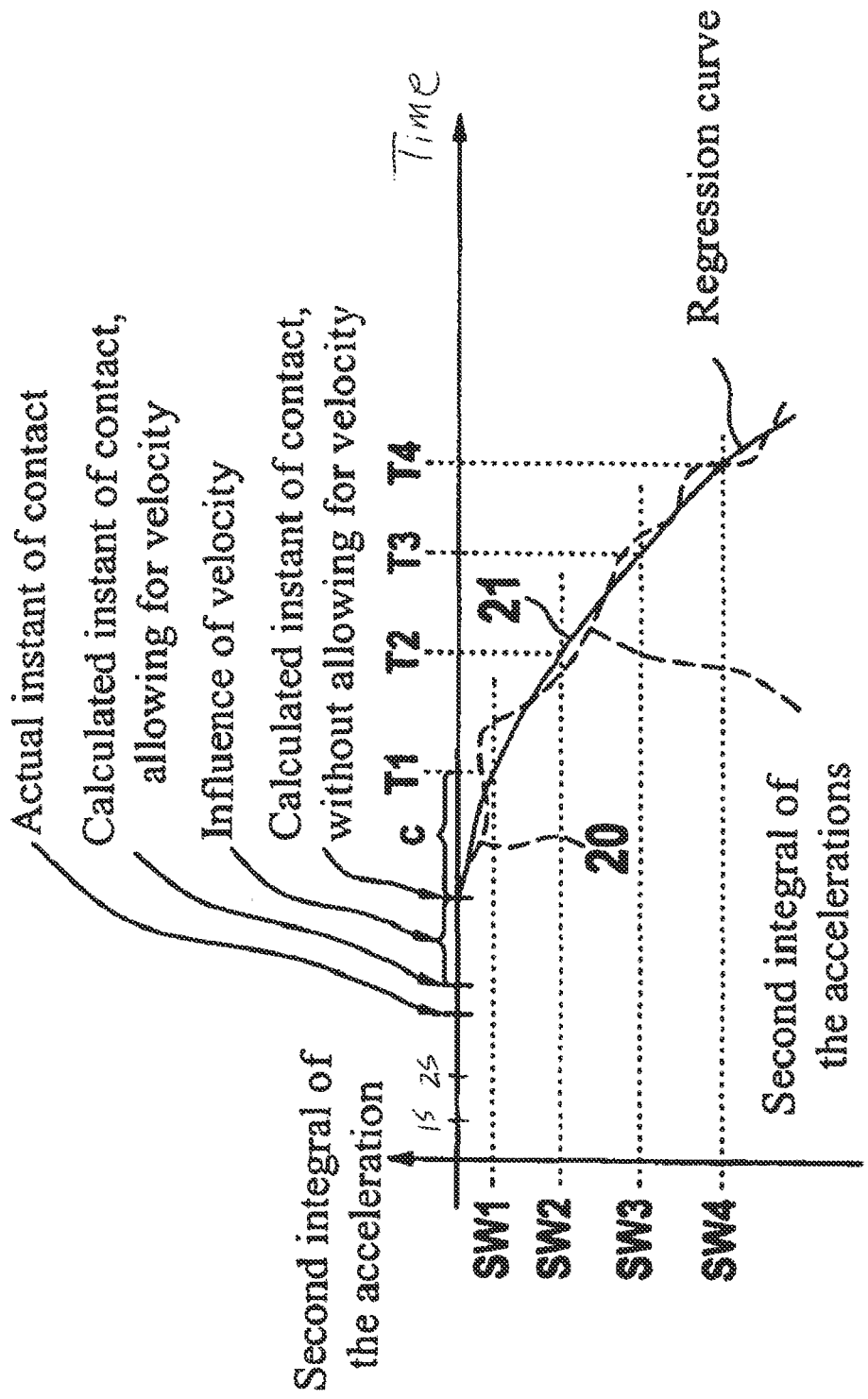
FIG. 2 shows an illustration of the signal and the corresponding approximation.

FIG. 2 clarifies the approximation method in a signal time diagram. The second integral of the acceleration signal is plotted on the ordinate, while the time is plotted on the abscissa. The second integral of the acceleration is represented by broken-line curve 20. In this case, four threshold values SW1, SW2, SW3 and SW4 are provided which are time-invariant, i.e., they do not change as a function of time. If signal 20 exceeds particular threshold values SW1, SW2, SW3 and SW4, then this is marked by instants T1, T2, T3 and T4. As a result, sampled values of signal 20 are available. On the basis of these sampled values, a quadratic function is then defined, for example, which describes the interrelationship between instants T1, T2, T3 and T4 and threshold values SW1, SW2, SW3 and SW4 in the best possible manner. When the mapping of the instants onto the threshold values is quadratic, then a root function maps the threshold values onto the instants. Since the threshold values are defined prior to execution of the method, the root function, thus the mapping of the threshold values onto the instants, is considered in the following. Thus, this is generally represented as:

$$f(SW) = a\sqrt{-SW+b} + c.$$

It must obey the additional secondary condition that, for threshold value 0, its derivative have the value infinity. Therefore, it holds that:

$$f'(SW) = -a\frac{1}{\sqrt{-SW+b}}$$

From this, it follows that b=0. It then holds that $$f(SW) = a\sqrt{-SW} + c.$$

Since threshold values SW1 through SW4 are defined during the application phase, i.e., prior to use in the control unit, the radical may already be calculated in advance, so that determining the position of the vertex is a linear regression problem that, due to its minimal computational outlay, is able to be calculated during the application on the control unit.

Parameter c describes the position of the vertex of the root function. As illustrated in FIG. 2, from this, one derives a first approximation for the time interval that elapsed since the instant of contact until instant T1, i.e., until threshold SW1 is exceeded. This means that, from the knowledge of instant T1 and summand c, the instant of contact may be determined by backwards calculation. The process is further enhanced by considering the impact velocity in the calculation as well. This may be approximated in a first approximation using the vehicle velocity. Namely, the higher the impact velocity is, the faster the harder structures in the vehicle are hit, and the closer the instant of contact calculated from T1 and c is to the actual instant of contact, since the time interval that elapses until a significant acceleration signal occurs, is shorter. Thus, the process of calculating the instant of contact is improved by subtracting a period of time that is linearly dependent on the impact velocity, from this thus calculated instant of contact.

Depending on the available computing capacity, it is possible to perform the calculation using a greater or lesser number of threshold values and instants, using a simpler, e.g., a linear, or more complex function, for example including a term having a third root, and/or using a simpler or piecewise constant function, or using a more complex approach whereby the impact velocity is considered. Such measures make it possible to reduce the computational outlay and, respectively, to improve the accuracy of the calculation. The regression curve is indicated in FIG. 2 by reference numeral 21.

Figure 3:
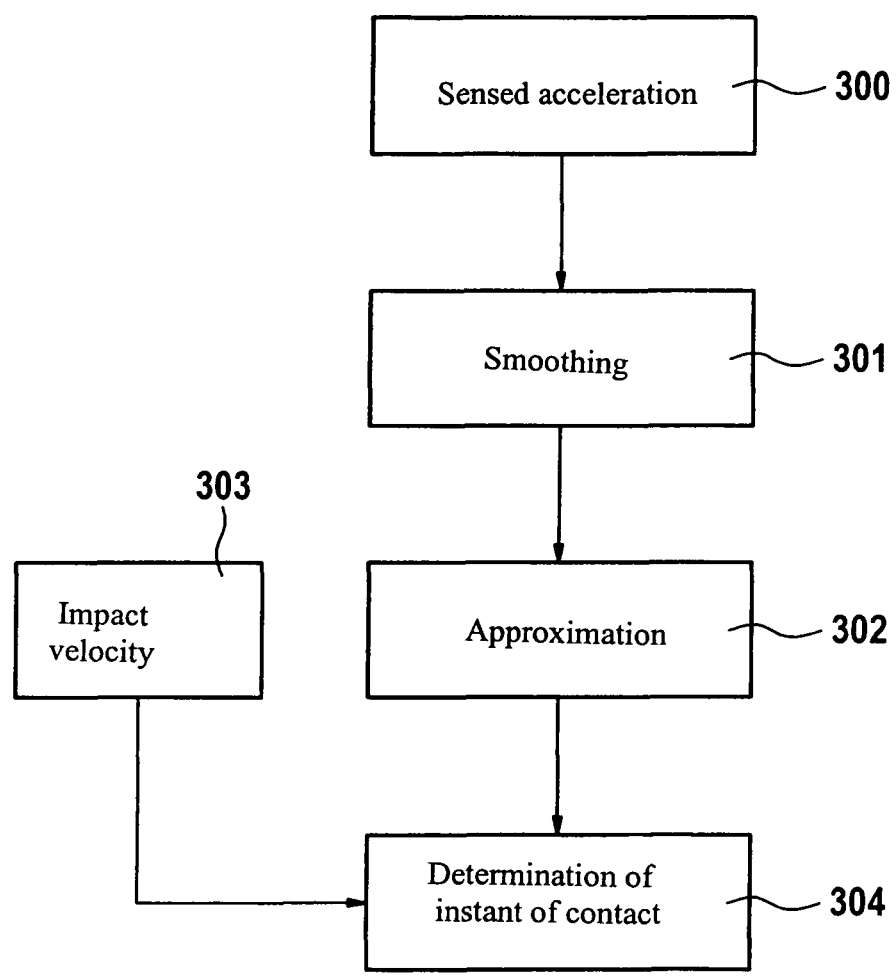
FIG. 3 shows a flow chart.

In a flow chart, FIG. 3 clarifies the functional sequence run through by the device according to the present invention. In method step 300, the acceleration is sensed by an acceleration sensor in the control unit, and an acceleration signal is generated. The acceleration sensor is of a micromechanical type, but is not limited to such a design. The acceleration signal is fed, for example, to the analog input of a microcontroller in the control unit, or it is a question of a digital acceleration sensor, which, itself, already outputs the digital signal. Already in the analog domain, a smoothing operation using filters, for example low-pass filters, may be carried out, such filters also being able to be implemented electronically and then used by the microcontroller for digital signals. This smoothing operation takes place in method step 301. This also includes the double integration of the acceleration signal, as used here, which likewise leads to a smoothing. Thus, a lower-frequency function is provided, on which an approximation by a function is carried out in method step 302. This approximation is carried out on the basis of interpolation points on the twice integrated acceleration signal, thus the forward displacement. The interpolation points are determined by threshold values and by the times at which the approximating function assumes the threshold values. The vertex is calculated from this approximating function. In a first approximation, this vertex determines the instant of contact. This is carried out in method step 304. Thus, the process of calculating the instant of contact is improved by subtracting a period of time that is linearly dependent on the impact velocity, from this thus calculated instant of contact. The impact velocity is made available in method step 303, in order to then take it into consideration in method step 304, when determining the instant of contact. As described above, allowing for the impact velocity is optional.

What is claimed is:

1. A device for determining an instant a vehicle makes contact with an impact object, comprising:
    a determining arrangement for determining the instant of contact by approximating a signal derived from an acceleration signal using a quadratic function, wherein the determining arrangement determines the instant of contact from a vertex of the quadratic function,
    an arrangement for one of filtering the acceleration signal and integrating the acceleration signal once or twice;
    an approximating arrangement for approximating the signal using at least two threshold values, and
    wherein the determining arrangement takes into account an impact velocity when determining the instant of contact in a backward calculation from a time instant that is after the instant of contact.

2. The device as recited in claim 1, further comprising:
    an approximating arrangement for approximating the signal using four threshold values.

3. The device as recited in claim 1, wherein the determining arrangement determines the instant of contact from a vertex of the quadratic function, and wherein the determining arrangement takes into account an impact velocity linearly in the determination of the instant of contact.

4. The device as recited in claim 1, wherein the signal is twice-integrated from an acceleration signal using a quadratic function, and wherein the determining arrangement determines the instant of contact from a vertex of the quadratic function.

5. The device as recited in claim 1, wherein the determining arrangement determines the impact velocity as a function of a vehicle velocity, and wherein the determining arrangement determines the impact velocity as a function of a surrounding-field signal.

6. The device as recited in claim 5, wherein the determining arrangement determines the instant of contact from a vertex of the quadratic function, and wherein the determining arrangement takes into account an impact velocity linearly in the determination of the instant of contact.

7. The device as recited in claim 6, wherein the approximating arrangement uses four threshold values.

8. A device for determining an instant a vehicle makes contact with an impact object, comprising:
    a determining arrangement for determining the instant of contact by approximating a signal derived from an acceleration signal using a quadratic function,
    wherein the determining arrangement takes into account an impact velocity when determining the instant of contact in a backward calculation from a time instant that is after the instant of contact.

9. The device as recited in claim 8, wherein the determining arrangement determines the impact velocity as a function of a vehicle velocity.

10. The device as recited in claim 9, wherein the determining arrangement determines the impact velocity as a function of a surrounding-field signal.

11. The device as recited in claim 9, further comprising:
    an approximating arrangement for approximating the signal using four threshold values.

12. The device as recited in claim 9, further comprising:
    an approximating arrangement for approximating the signal using two threshold values.

13. The device as recited in claim 9, further comprising:
    an approximating arrangement for approximating the signal using four threshold values.

14. A method for determining an instant when a vehicle makes contact with an impact object, the method comprising:
    sensing an acceleration, using an acceleration sensor in a control unit, and generating an acceleration signal;
    providing the acceleration signal to an input of a microcontroller in the control unit;
    smoothing the acceleration signal in a smoothing operation using a filter, the filtering including providing a double integration of the acceleration signal to provide a lower-frequency function on which an approximating function is to be performed;
    performing the approximation based on interpolation points on the twice integrated acceleration signal, wherein the interpolation points are determined by threshold values and by the times at which the approximating function assumes the threshold values;
    determining a vertex from the approximating function, wherein in a first approximation, the vertex determines the instant of contact to provide a first determined instant of contact; and
    determining another instant of contact by subtracting a period of time, which is linearly dependent on the impact velocity, from the first determined instant of contact in a backward calculation.

15. A device for determining an instant when a vehicle makes contact with an impact object, comprising:
    a sensing arrangement, in a control arrangement, for sensing an acceleration and generating an acceleration signal, and providing the acceleration signal to an input of a microcontroller in the control unit;
    a smoothing arrangement to smooth the acceleration signal in a smoothing operation, the smoothing arrangement including a filter to provide a double integration of the acceleration signal to provide a lower-frequency function on which an approximating function is to be performed;
    an approximating arrangement to provide an approximating function to approximate the instant of contact, based on interpolation points on the twice integrated acceleration signal, wherein the interpolation points are determined by threshold values and by the times at which the approximating function assumes the threshold values;
    a vertex determining arrangement to determine a vertex from the approximating function, wherein in a first approximation, the vertex determines the instant of contact to provide a first determined instant of contact; and
    a processing arrangement to determine another instant of contact by subtracting a period of time, which is linearly dependent on the impact velocity, from the first determined instant of contact in a backward calculation.

* * * * *

UNITED STATES PATENT AND TRADEMARK OFFICE
CERTIFICATE OF CORRECTION

PATENT NO.       : 8,698,611 B2
APPLICATION NO. : 10/575658
DATED            : April 15, 2014
INVENTOR(S)      : Marc Theisen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1411 days.

Signed and Sealed this

Twenty-ninth Day of September, 2015

Michelle K. Lee
*Director of the United States Patent and Trademark Office*